May 12, 1942.                C. F. BAISCH                2,282,390
                             MASTER CYLINDER
                          Filed March 20, 1939

INVENTOR.
CARL F. BAISCH
BY
ATTORNEYS

Patented May 12, 1942

2,282,390

UNITED STATES PATENT OFFICE 2,282,390

MASTER CYLINDER

Carl F. Baisch, Detroit, Mich., assignor to Kelsey-Hayes Wheel Company, Detroit, Mich., a corporation of Delaware Application March 20, 1939, Serial No. 263,068

2 Claims. (Cl. 60—54.6)

The invention relates to master cylinders for developing fluid pressure to apply a brake.

The invention has for one of its objects to provide a master cylinder which is constructed to maintain a substantially constant level of the braking liquid in the reservoir during normal operation to thereby substantially eliminate breathing and the possibility of entrance of dust and the like. The invention has for other objects to simplify the construction of master cylinder and to produce a master cylinder which is positive and effective in operation.

With these and other objects in view, the invention resides in the novel features of construction and combinations and arrangements of parts as more fully hereinafter set forth.

Figure 1:
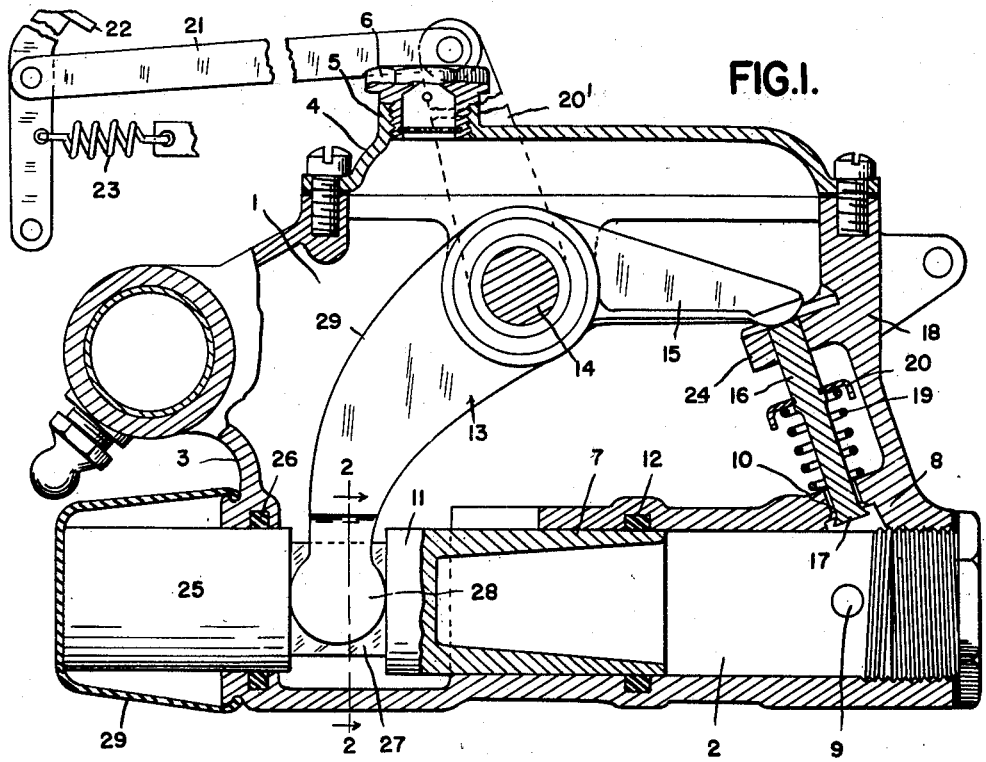
Figure 1 is a vertical median cross section of a master cylinder showing an embodiment of my invention.
Figure 2:
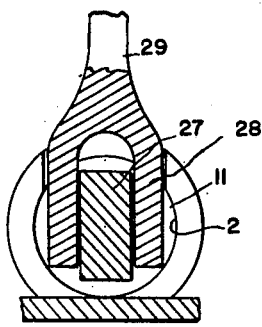
Figure 2 is a cross section on the line 2—2 of Figure 1.

The master cylinder illustrated in the drawing is adapted to develop braking fluid pressure in that portion of the brake system, including the wheel cylinders, to apply the brakes of a motor vehicle. The master cylinder comprises the reservoir 1 and the cylinder 2 at the bottom of and opening at one end into the reservoir. The reservoir and also the cylinder are formed by the body 3 which is preferably a casting. The top of the body is closed by the cover 4 which is provided with the filler neck 5 through which the braking liquid may be poured into the reservoir. 6 is a cap secured to the filler neck and having a restricted passageway for air.

The cylinder 2 comprises the piston engaging portion 7 and the forward portion 8 located in advance of the piston engaging portion and extending to a height above the uppermost part of the piston engaging portion. The forward portion is adapted to communicate with tubing leading to the wheel cylinders through the port 9. The forward portion is also adapted to communicate with the reservoir 1 through the port 10 in its upper wall.

11 is the piston reciprocable within the piston engaging portion 7 of the cylinder which is provided with the annular packing member 12 preferably in the nature of a rubber ring. The piston is adapted to be advanced and retracted by means of the bell crank 13 which is preferably keyed to the shaft 14 extending transversely through and journaled in the side walls of the body 3. The bell crank is also adapted to control passage of the braking liquid through the port 10, it having the arm 15 adapted when the piston 11 is in its retracted position to engage the stem 16 of the valve 17 for closing the port. The stem extends upwardly and at an angle through the port 10 and within the reservoir and slidably engages and is guided by the wall or bracket 18 of the body 3. A suitable coil spring 19 between the wall of the forward portion of the cylinder and the C-washer 20 secured upon the valve stem 16 serves to normally hold the valve 17 in closed position. With this construction, it will be noted that when the piston 11 is in retracted position the arm 15 of the bell crank 13 is in engagement with the upper end of the valve stem 16 and holds the valve 17 in open position, thereby placing the reservoir in communication with the forward portion of the cylinder. The bell crank is adapted to be swung by means of the lever 20' secured upon an end of the shaft 14 at one side of the reservoir, the free end of the lever being connected by the link 21 to the foot pedal 22 of the motor vehicle. A usual coil spring 23 connected to the foot pedal holds it in normal position, which is determined by the hub of the bell crank 13 engaging the stop lug 24 upon the body 3.

For the purpose of maintaining a substantially constant level of the braking liquid in the reservoir 1 during the normal operation of the master cylinder, or during the reciprocation of the piston 11, the piston 25 is provided having a volumetric displacement which compensates for the volumetric displacement of the piston 11. The piston 25 is in axial alignment with and of the same diameter as the piston 11 and extends through the end wall of the body 3 opposite the port 9. An annular packing member 26, preferably in the nature of a rubber ring, is located in the portion of the end wall surrounding the piston 25. The adjacent ends of the pistons 25 and 11 are spaced from each other and rigidly connected together by the rod 27 of reduced diameter. This rod is embraced by the furcations 28 of the arm 29 of the bell crank lever 13 and the furcations are engageable with the spaced ends of the pistons to positively reciprocate the same. With this construction, the pistons 25 and 11 have equal volumetric displacements per units of movement and the piston 25 is adapted to advance in the reservoir upon advancement of the piston 11 in the cylinder so that constant level of the braking liquid in the reservoir is maintained during the movement of the pistons.

29 is a flexible cap preferably formed of rubber having its edge clamped in dust-tight relation to the end wall of the body 3 and its crown extending past the outer end of the piston 25. This cap prevents the entrance of dust between the end wall and the piston.

What I claim as my invention is:

1. A master cylinder comprising a liquid reservoir, a cylinder at the bottom of and opening at one end into said reservoir, a piston movable in said cylinder, a second piston in substantially axial alignment with said first mentioned piston and having substantially the same diameter, said second piston extending through a wall of said reservoir, a rod of reduced diameter rigidly connecting adjacent ends of said pistons, a lever having furcations embracing said rod and engageable with said adjacent ends for moving said pistons, and a flexible cap secured to said reservoir and extending over the outer end of said second piston.

2. A master cylinder comprising a liquid reservoir, a cylinder at the bottom of and opening at one end into said reservoir, a piston movable in said cylinder, a second piston supported in substantially axial alignment with the first piston and extending into the reservoir through an opening in the wall of the reservoir opposite the open end of the cylinder, said second piston having substantially the same diameter as the first piston and connected to the first piston for movement in unison with the latter into the reservoir upon advancement of the first piston in the cylinder, and a flexible cap secured to the side wall aforesaid of the reservoir in a position to receive the outer end of the second piston upon movement of the first piston to its retracted position.

CARL F. BAISCH.